United States Patent [19]

DeMatteo et al.

[11] Patent Number: 4,859,359

[45] Date of Patent: Aug. 22, 1989

[54] HARD SURFACE CLEANING AND POLISHING COMPOSITIONS

[75] Inventors: John A. DeMatteo; Gregory P. Pilant, both of Memphis, Tenn.

[73] Assignee: Dyna-5, Inc., Memphis, Tenn.

[21] Appl. No.: 173,309

[22] Filed: Mar. 25, 1988

[51] Int. Cl.$^4$ ............................ C11D 7/22; C09G 1/04
[52] U.S. Cl. ............................ 252/174.15; 252/171; 252/174.17; 252/DIG. 14; 106/3; 106/11
[58] Field of Search ............... 252/174.15, 171, 174.17, 252/DIG. 14; 106/3, 11

[56] References Cited

U.S. PATENT DOCUMENTS

| | | | |
|---|---|---|---|
| 3,095,381 | 6/1963 | Tinnon et al. | 252/558 |
| 4,124,523 | 11/1978 | Johnson | 106/2 |
| 4,212,759 | 7/1980 | Young et al. | 252/119 |
| 4,440,745 | 4/1984 | Schmidt et al. | 252/174.15 |
| 4,565,644 | 1/1986 | Smith et al. | 252/174.15 |

Primary Examiner—Paul Lieberman
Assistant Examiner—Christine A. Skane
Attorney, Agent, or Firm—Dressler, Goldsmith, Shore, Sutker & Milnamow, Ltd.

[57] ABSTRACT

A composition is described which cleans, imparts water repellency and polishes hard surfaces. This composition comprises a solvent mixture of a glycol ether, a lower aliphatic alcohol, a hydrocarbon solvent and water, together with an organic polysiloxane, a silane, and a polycarboxylic chelating acid. A preferred composition contains propylene glycol monomethyl ether, isopropanol, high flash naphtha or mineral spirits, a polydimethysiloxane, citric acid, and orange oil terpene.

14 Claims, No Drawings

HARD SURFACE CLEANING AND POLISHING COMPOSITIONS

TECHNICAL FIELD

The present compositions are solvent-based products that utilize a balanced admixture of co-solvents together with the other constituents present to provide a substantially odorless composition having a relatively high flash point. The present compositions are particularly well suited for cleaning and polishing of hard surfaces such as floors by virtue of their ease of application, ease of rub-out or buffing, depth of gloss, water resistance, drying time, and like attrbutes.

BACKGROUND

Several hard surface cleaning compositions are known which employ various constituents and have various utility. Many of the presently available compositions are unsatisfactory and difficult to use for a number of reasons. Some of the compositions are effective on limited numbers of surfaces, others involve the handling of hazardous or toxic solvents or other components, and still others have relatively low flash points. The requirement for the use of special storing and application techniques, or the requirement that surfaces be prepared in a special manner prior to treatment represent important considerations in the use of many of the known compositions.

It is well known to include silicones or siloxanes in various cleaning compositions either together with abrasives or with acid components. In U.S. Pat. No. 3,681,122 to Domicone et al. and in Canadian Patent No. 843,388 to Hyde abrasive silicone-containing cleaning and conditioning compositions are disclosed. While these compositions are effective for cleaning and conditioning glass-ceramic surfaces, they have certain unsatisfactory properties as well. When the compositions contain a soluble alkaline metal silicate they are useful for cleaning glass-ceramic surfaces which have been stained, but the surface maintains and develops a stubborn stain over a period of time. If an analogous composition is utilized which is free of the soluble, alkaline metal silicate, it is effective for protecting the glass-ceramic surface without causing further stain but it also lacks the cleaning power to remove the old stain.

In U.S. Pat. No. 3,095,381 to Tinnon et al. a hard surface cleaning composition is disclosed which contains an alkyl-substituted tertiary acetylenic hexynol which additionally contains an organic solvent, isopropyl and diethylene glycol monoethyl ether, as well as non-volatile surfactants. U.S. Pat. No. 4,689,168 to Requejo discloses a hard surface cleaning composition containing an organic polar solvent, a volatile organosiloxane and a surfactant which is an acetylenic alcohol or diol.

U.S. Pat. No. 3,579,540 to Ohlhausen discloses a water repellant composition for use on non-porous substrate surfaces. The disclosed composition contains a mineral acid and an alkylpolysiloxane, which produces a strongly adherent and durable water repellant film upon the substrate following application.

In U.S. Patent No. 4,124,523 to Johnson an aqueous, acidic composition is disclosed which contains polydimethylsiloxane, water, acid, an abrasive and colloidal silica together with an non-ionic surfactant. This composition is an aqueous solution which has abrasive cleaning and conditioning properties but which is not quick-drying.

U.S. Pat. No. 4,212,759 to Young et al. discloses a water-based acidic cleaning composition which contains acid, a detergent and a polysilicone. This composition is disclosed to produce an acid-stable emulsion which may be used as a cleaning composition. Various organic and inorganic acids are utilized in the disclosed composition such as oxalic acid or sulfamic acid.

In U.S. Pat. No. 4,013,579 to Nakasone et al. an aqueous acidic cleaning solution is disclosed which utilizes a furanor tetrahydrofuran carboxylic acid compound. This patent states that oxalic acid, while an effective spot remover, has a very high toxicity and a high skin penetrating property and therefore the use of compositions containing oxalic acid is said to be undesirable. Other cleaning compositions are disclosed in U.S. Pat. No. 4,311,608 to Maurice and U.S. Pat. No. 4,181,622 to Gavin; these patents disclose cleaning solutions which contain polysiloxanes and/or acid components.

The cleaning solutions disclosed above are aqueous-based, and thus not quick-drying, or contain an abrasive. These compositions do not provide effective cleaning together with imparting water resistance and shine to the applied hard surface. The present invention relates to a solvent-based composition which successfully overcomes or at least minimizes these difficulties, and which also has a relatively high flash point.

SUMMARY OF THE INVENTION

The present invention relates to a liquid cleaning and polishing composition for use on hard surfaces. The composition of the present invention comprises a solvent mixture, containing a glycol ether as a major component together with a combination of a lower aliphatic alcohol, a hydrocarbon solvent and water as a minor component, an organic polysiloxane soluble in the solvent mixture, a silane, and a polycarboxylic chelating acid. The composition of the present invention may also contain an aminofunctional organic polysiloxane, a terpene hydrocarbon such as orange oil terpene, and/or a halogenated hydrocarbon solvent.

Compositions of the present invention are particulalry well suited for cleaning and polishing of hard surfaces.

DETAILED DESCRIPTION OF INVENTION

The major or principal constituent of the solvent system suitable for preparing the compositions of this invention is a glycol ether. Illustrative glycol ethers are the alkylene glycol ethers such as ethylene glycol monomethyl ether, ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, dipropylene glycol monomethyl ether, tripropylene glycol monomethyl ether, ethylene glycol monoisobutyl ether, diethylene glycol monoisobutyl ether, propylene glycol monoisobutyl ether, ethylene glycol monophenyl ether, propylene glycol monophenyl ether, mixtures of the foregoing, and the like. Preferred is a mixture of propylene glycol monomethyl ether and ethylene glycol mono-n-butyl ether in a weight ratio of about 100:1 to about 3:1, respectively; more particularly in a respective weight ratio of about 10:1.

Halogenated hydrocarbon solvents that are suitable for compounding the present mixed solvent system include 1,1,1-trichloroethane, 1,1,2-trichloroethane, trichlorotrifluoroethane, o-dichlororbenzene, alphachloronaphthalene, and the like. The halogenated hydrocarbon solvent is an optional but preferred constituent of the present compositions and can be present in an amount up to about 10 percent by weight of the composition.

Suitable hydrocarbon solvents for the present purposes are those having a kauri-butanol value of about 20 to about 50 and a boiling point of about 80° C to about 200° C., preferably about 95° C. to about 150° C. The "kauri-butanol value" is a measure of the solvent power of the hydrocarbon liquid. Kauri gum is readily soluble in butanol but insoluble in hydrocarbons, thus this value is the measure of the volume of solvent required to produce turbidity in a standard solution containing kauri gum dissolved in butanol. Naphtha fractions ahve a kauri butanol value of about 30 and toluene about 105.

Illustrative suitable hydrocarbon solvents are mineral spirits, high flash naphtha, kerosene, Stoddard solvent, isoparaffinic hydrocarbon solvents, and the like. Illustrative isoparaffinic solvents that are substantially odor-free are those commercially available under the designation ISOPAR from Exxon Chemical Company, Houston, Texas, and under the designation SOLTROL from Phillips Petroleum Corporation, Bartlesville, Oklahoma.

Suitable lower aliphatic alcohols for the present system of cosolvents are ethanol, isopropanol, n-propanol, sec-butanol, n-butanol, hexanol, cyclohexanol, mixtures thereof, and the like. Preferably, the aliphatic alcohols have a boiling point of about 75° C. to about 100° C. and contain two to four carbon atoms, inclusive. Accordingly, such preferred aliphatic alcohols are ethanol, the propanols, and the butanols. Particularly preferred is a mixture of isopropanol and ethanol in equal parts by weight.

Water is present in the contemplated compositions as a relatively minor constituent, usually in an amount of about 0.5 to about 4 percent by weight of the composition, to assist in the cleaning action and to elevate the flash point of the composition.

A preferred solvent mixture for the present purposes is constituted by a glycol ether in an amount of more than 50 parts by weight to about 90 parts by weight, a lower aliphatic alcohol in an amount of about 0.2 to about 10 parts by weight, a hydrocarbon solvent in an amount of about 5 to about 25 parts by weight, and water in an amount of about 0.5 to about 4 parts by weight. A particularly preferred solvent mixture is constituted by propylene glycol methyl ether in an amount of about 50 to about 60 parts by weight, ethylene glycol n-butyl ether in an amount of about 5 to about 6 parts by weight, ethanol in an amount of about 0.4 to about 0.5 parts by weight, isopropanol in an amount of about 0.4 to about 0.5 parts by weight, high flash naphtha in an amount of about 12 to about 16 parts by weight, and water in an amount of about 2 to about 3 parts by weight.

The contemplated organic polysiloxanes are film formers having viscosity in the range of about 5 to about 50,000 centistokes, preferably about 100 to about 10,000 centistokes. More preferably, a mixture of polysiloxanes having relatively higher and relatively lower viscosities is employed. Such polysiloxanes have the repeating group

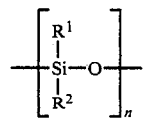

wherein n is an integer having a value greater than 1, $R^1$ is an alkyl radical containing 1 to 7 carbon atoms, inclusive, $R^2$ is a member of the group consisting of hydrogen, an alkyl radical containing 1 to 7 carbon atoms, inclusive, or a phenyl group.

Illustrative polysiloxanes encompassed by the above formula are polydimethylsiloxane, polydiethyl siloxane, polymethylethyl siloxane, polymethylphenyl siloxane, and copolymers of two or more of the foregoing siloxanes. Polysiloxane-oxyalkylene block copolymers of the type described in U.S. Pat. No. 3,306,869 to Lahr et al. may also be utilized.

In addition to the aforementioned organic polysiloxanes, preferably the present compositions also include an aminofunctional polysiloxane as well as a silane. The amino-functional polysiloxane is a silicone fluid with highly polar pendant aminoalkyl modifying groups that enhance the durability of the film formed by the polysiloxanes present and promotes adhesion of the formed film to a wide variety of substrates.

Illustrative of the amino-functional polysiloxanes suitable for use in the present composition are the aminofunctional polydimethyl siloxane polymers commercially available under the designations Dow Corning 531 Fluid and Dow Corning 536 Fluid from Dow Corning Corporation, Midland, Michigan, the alkylene diaminofunctional dimethyl polysiloxane fluid commercially available under the designation Silicone Fluid F-756 from Wacker Silicones Corporation, Adrian, Michigan, the aminofunctional polysiloxane fluid commercially available under the designation Rhodorsil Oil 10646 from Rhone-Poulenc, Inc., Monmouth Junction, New Jersey, and the like.

Particularly preferred aminofunctional polysiloxanes are aminopropyl dimethyl-terminated polydimethyl siloxane and aminobutyldimethyl terminated polydimethyl siloxane.

As stated above, the present composition also contemplates an optional, but preferred, liquid silane constituent, which promotes the mutual solubility of the other organic silicone compounds present in the balanced solvent mixture utilized by the present compositions. Suitable liquid silanes are represented by the formula $R^3$-$Si(OR^4)_3$ wherein $R^3$ can be an alkyl radical containing one to three carbon atoms, inclusive or phenyl and $R^4$ can be an alkyl radical containing one or two carbon atoms, inclusive.

A preferred liquid silane constituent is an alkyl trialkoxysilane such as methyltrimethoxysilane. Other suitable silanes are methyltriethoxysilane, ethyltriethoxysilane, phenyltrimethoxysilane, phenyltriethoxysilane, and the like.

The polycarboxylic chelating acids contemplated by the prent compositions enhance the soil-removing ability thereof while cooperating with the polysiloxane constituents present to provide a durable, water repellent flim on the treated surfaces. For this purpose suitable acids are the polycarboxylic chelating acids having a first pK value in the range of about 1 to about 3.5. Illustrative of such acids are citric acid (pK$^1$ 3.09), oxalic acid (pK$^I$ 1.25), ethylenediaminetetraacetic acid (pK$^I$ 2.00), and the like. Citric acid is particularly preferred for the present purposes.

The amount of chelating acid present is in the range of about 0.5 to about 5 percent by weight of the composition and is at least equal to the amount, by weight, of the polysiloxane constituents that are present. Preferably, the amount of chelating acid and the total amount of the polysiloxane constituents present are in a weight ratio of about 2:1, respectively.

The present cleaning and polishing compositions also may include adjuvants such as a terpene hydrocarbon, e.g., orange oil terpene [1-methyl-4-(1-methylethenyl)-cyclohexene], dyes, fragrances, and the like. The terpene hydrocarbon can be present in an amount in the range of about 3 to about 20 percent by weight of the composition.

Having generally described this invention, a further understanding can be obtained by reference to certain specific examples which are provided herein for purposes of illustration only and are not intended to be limiting unless otherwise specified.

EXAMPLE 1

Cleaning and Polishing Compositions Containing a Chelating Acid and a Halogenated Hydrocarbon Solvent Compositions according to Tables 1 and 2 illustrate formulations utilizing citric acid and oxalic acid, respectively, as the polycarboxylic chelating acid. The halogenated hydrocarbon solvents are 1,1,1-trichloroethane and trichlorotrifluoroethane, respectively.

Resin 47V350 is a polymethylsiloxane which has a viscosity of 1,000 centistokes (cSt) at 25° C., is a 100% silicone fluid, and has a flash point of 570° F. (299° C.).

Resin 4518 is a methylpolysiloxane solution in mineral spirits which has a viscosity of 12 cST at 25° C., a solids content of 70 percent by weight, and a flash point of 122° F. (50° C.).

Resin 10646 is an aminofunctional polydimethylsiloxane, ahs a viscosity of 20 cSt at 25° C. and a flash point of 120° F. (54° C.).

Resins 47V350, 4518 and 10646 were obtained from Rhone-Poulenc, Inc., Monmouth Junction, N.J. under the trade name RHODORSIL.

TABLE 1

| Component | Approximate Preferred Range, % by weight | Approximate More Preferred Range, % by weight |
|---|---|---|
| Glycol Ether | | |
| Propylene Glycol Monoethyl Ether | 50-75 | 62 |
| Ethylene Glycol n-Butyl Ether | 0.5-15 | 6 |
| Lower Aliphatic Alcohol | | |
| Isopropanol | 0.1-5 | 0.4 |
| Ethanol | 0.1-5 | 0.4 |
| Hydrocarbon Solvent | | |
| 1,1,1-trichloroethane | 0-10 | 1 |
| high flash naphtha | 5-25 | 14 |
| Polysiloxane | | |
| Resin 47-V-350 | 0.1-7 | 0.5 |
| Resin 4518 | 0.1-7 | 0.5 |
| Amino Functional Polysiloxane | | |
| Resin 10646 | 0.05-5 | 0.2 |
| Silane | | |
| Methyltrimethoxysilane | 0.1-5 | 0.6 |
| Chelating Acid | | |

TABLE 1-continued

| Component | Approximate Preferred Range, % by weight | Approximate More Preferred Range, % by weight |
|---|---|---|
| Citric Acid | 0.5-5 | 2 |
| Other Components | | |
| Water | 0.5-4 | 2.5 |
| Orange Oil Terpene | 3-20 | 9 |

TABLE 2

| Component | Approximate Preferred Range, % by weight | Approximate More Preferred Range, % by weight |
|---|---|---|
| Glycol Ether | | |
| Propylene Glycol Monomethyl Ether | 50-75 | 70 |
| Ethylene Glycol Mono-n-Butyl Ether | 0.5-15 | 7 |
| Lower Aliphatic Alcohol | | |
| Isopropanol | 0.1-5 | 0.3 |
| Ethanol | 0.1-5 | 0.3 |
| Hydrocarbon Solvent | | |
| Trichlorotrifluoroethane | 0-10 | 1 |
| Mineral Spirits | 5-25 | 12 |
| Polysiloxane | | |
| Resin 47-V-350 | 0.1-7 | 0.4 |
| Resin 4518 | 0.1-7 | 0.4 |
| Amino Functional Polysiloxane | | |
| Aminobutyldimethyl-terminated Polydimethylsiloxane | 0.05-5 | 0.2 |
| Silane | | |
| Methyltrimethoxysilane | 0.1-5 | 0.5 |
| Chelating Acid | | |
| Oxalic Acid | 0.5-5 | 1 |
| Other Components | | |
| Water | 0.5-4 | 2 |
| Orange Oil Terpene | 3-20 | 5 |

EXAMPLE 2

Compositions Containing Citric acid which Do Not Contain a Halogenated Hydrocarbon Solvent The compositions illustrated in Tables 3 and 4 utilize naphtha and mineral spirits, respectively, as the hydrcarbon solvent which is present at a concentration of about 15% by weight of the composition. The polysiloxane resins utilized are the same as those described in Example 1, above.

TABLE 3

| Component | Approximate Preferred Range, % by weight | Approximate More Preferred Range, % by weight |
|---|---|---|
| Glycol Ether | | |
| Propylene Glycol Monomethyl Ether | 50-75 | 62 |
| Ethylene Glycol Mono-n-Butyl Ether | 0.5-15 | 6 |
| Lower Aliphatic Alcohol | | |
| Isopropanol | 0.1-5 | 0.5 |
| Ethanol | 0.1-5 | 0.5 |
| Hydrocarbon Solvent | | |
| High Flash Naphtha (140 Solvent) | 5-25 | 15 |
| Polysiloxane | | |
| Resin 47-V-350 | 0.1-7 | 0.5 |
| Resin 4518 | 0.1-7 | 0.5 |
| Amino Functional Polysiloxane | | |
| Resin 10646 | 0.05-5 | 0.2 |

TABLE 3-continued

| Component | Approximate Preferred Range, % by weight | Approximate More Preferred Range, % by weight |
|---|---|---|
| Silane | | |
| Methyltrimethoxysilane | 0.1–5 | 0.5 |
| Chelating Acid | | |
| Citric Acid | 0.5–5 | 2 |
| Other Components | | |
| Water | 0.5–4 | 3 |
| Orange Oil Terpene | 3–20 | 9 |

TABLE 4

| Component | Approximate Preferred Range % by weight | Approximate More Preferred Range, % by weight |
|---|---|---|
| Glycol Ether | | |
| Propylene Glycol Monomethyl Ether | 50–75 | 62 |
| Ethylene Glycol Mono-n-Butyl Ether | 0.5–15 | 6 |
| Lower Aliphatic Alcohol | | |
| Isopropanol | 0.1–5 | 0.4 |
| Ethanol | 0.1–5 | 0.4 |
| Hydrocarbon Solvent | | |
| Mineral Spirits | 5–25 | 15 |
| Polysiloxane | | |
| Dimethyl polysiloxane | 0.1–7 | 0.5 |
| Methyl polysiloxane | 0.1–7 | 0.5 |
| Amino Functional Polysiloxane | | |
| Aminopropyldimethyl-terminated Polydimethylsiloxane | 0.05–5 | 0.2 |
| Silane | | |
| Methyltrimethoxysilane | 0.1–5 | 0.5 |
| Chelating Acid | | |
| Citric Acid | 0.5–5 | 2 |
| Other Components | | |
| Water | 0.5–4 | 3 |
| Orange Oil Terpene | 3–20 | 10 |

EXAMPLE 3

Compositions for Cleaning, Polishing and Preserving the Shine on a Hard Surface

Table 5 tabulates the components for a composition of the present invention which is especially preferred and useful to clean, impart water repellency and polish hard surface substrates such as floors.

TABLE 5

| Component | Amount (% by weight) |
|---|---|
| Glycol Ether | |
| Propylene Glycol Monomethyl Ether | 63 |
| Ethylene Glycol Mono-n-Butyl Ether | 5.8 |
| Lower Aliphatic Alcohol | |
| Isopropanol | 0.4 |
| Ethanol | 0.4 |
| Hydrocarbon Solvent | |
| 1,1,1-trichloroethane | 1.1 |
| High Flash Naphtha (140 Solvent) | 14.6 |
| Polysiloxane | |
| Resin 47-V-350 | 0.4 |
| Resin 4518 | 0.5 |
| Amino Functional Polysiloxane | |
| Resin 10646 | 0.1 |
| Silane | |
| Methyltrimethoxysilane | 0.6 |
| Chelating Acid | |
| Citric Acid | 1.9 |
| Other Components | |
| Water | 2.8 |
| Orange Oil Terpene | 9.3 |

EXAMPLE 4

Slip Resistance

The composition of the present invention illustrated in Table 6 was applied to panels and evaluated for slip resistance according to the established American Society for Testing and Materials Procedure ASTM D-2047. In this assay the James Machine is used to evaluate the coefficient of friction. The results obtained are shown in Table 7. Components are as described in Example 1. Z-6070 is a methyltrimethoxysilane fluid manufactured by Dow-Corning, Midland, Mich. which has a flash point of 50° F. (10° C). and a specific gravity of 0.950 at 77° F. (25° C.).

TABLE 6

| Component | Amount % by weight |
|---|---|
| Propylene Glycol Monomethyl Ether | 63.7 |
| Ethylene Glycol Mono-n-butyl Ether | 6 |
| Isopropanol, 99% | 0.4 |
| Ethanol | 0.4 |
| 1,1,1-Trichloroethane | 1.2 |
| High Flash Naphtha (140 Solvent) | 14.6 |
| Resin 47-V-350 | 0.4 |
| Resin 4518 | 0.5 |
| Resin 10646 | 0.2 |
| Methyltrimethoxysilane (Z6070) | 0.6 |
| Citric Acid | 0.8 |
| Water | 2.8 |
| Orange Oil Terpene | 9.3 |

Specific gravity = 0.901 at 75° F.
Tag Open Cup flash point: 105° + 1° F.

TABLE 7

| Test Runs: Coefficient of Friction | | | |
|---|---|---|---|
| .53 | .53 | .54 | .53 |
| .54 | .52 | .53 | .53 |
| .53 | .54 | .53 | .53 |
| Average: .53 | | | |

Numerous modifications and variations of the present invention are possible in light of the above teachings. It is therefore to be understood that within the scope of the appended claims, the invention may also be practiced otherwise than as specifically described herein.

We claim:

1. A solvent-based liquid cleaning and polishing composition, suitable for use on hard surfaces, which comprises a solvent mixture in which a major portion is constituted by a glycol ether and a minor portion is constituted by a combination of a lower aliphatic alcohol, a hydrocarbon solvent, and water;

an organic polysiloxane soluble in said solvent mixture, dissolved therein in an amount of about 0.1 to about 7 percent by weight of the composition, and having the repeating group

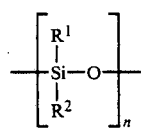

wherein n is an integer having a value greater than 1, $R^1$ is an alkyl radical containing 1 to 7 carbon atoms, inclusive, $R^2$ is a member of the group consisting of hydrogen, an alkyl radical containing 1 to 7 carbon atoms, inclusive, and phenyl;

a silane having the formula

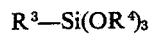

wherein $R^3$ is selected from the group consisting of an alkyl radical containing 1 to 3 carbon atoms, inclusive, and phenyl, and $R^4$ is an alkyl radical containing 1 to 2 carbon atoms, inclusive, dissolved in said solvent mixture in an amount in the range of about 0.1 to about 5 percent by weight of the composition; and a polycarboxylic chelating acid having a first pK value in the range of about 1 to about 3.5 dissolved in said solvent mixture in an amount in the range of about 0.5 to about 5 percent by weight of the composition.

2. The composition in accordance with claim 1 wherein the chelating acid is citric acid.

3. The composition in accordance with claim 1 wherein the chelating acid is oxalic acid.

4. The composition in accordance with claim 1 wherein said glycol ether is a mixture of propylene glycol monomethyl ether and ethylene glycol mono-n-butyl ether in a weight ratio of about 10:1, respectively.

5. The composition in accordance with claim 1 wherein an amino-functional organic polysiloxane is also present in an amount in the range of about 0.05 to about 5 percent by weight of the composition.

6. The composition in accordance with claim 5, wherein said aminofunctional organic polysiloxane is aminopropyldimethyl-terminated polydimethylsiloxane.

7. The composition according to claim 5 wherein said aminofunctional organic polysiloxane is an aminofunctional polydimethyl siloxane polymer.

8. The composition in accordance with claim 1 wherein a terpene hydrocarbon is present in an amount in the range of about 3 to about 20 percent by weight of the composition.

9. The composition in accordance with claim 8 wherein said terpene hydrocarbon is orange oil terpene.

10. The composition in accordance with claim 1 wherein the solvent mixture also includes a halogenated hydrocarbon solvent in an amount up to about 10 percent by weight of the composition.

11. The composition in accordance with claim 10 wherein the halogenated hydrocarbon solvent is 1,1,1-trichloroethane.

12. The composition in accordance with claim 10 wherein the halogenated hydrocarbon solvent is trichlorotrifluoroethane.

13. The composition in accordance with claim 1 wherein the solvent mixture is constituted by a glycol ether in an amount of more than 50 parts by weight to about 90 parts by weight, a lower aliphatic alcohol in an amount of about 0.2 to about 10 parts by weight, a hydrocarbon solvent in an amount of about 5 to about 25 parts by weight, and water in an amount of about 0.5 to about 4 parts by weight.

14. The composition in accordance with claim 13, wherein the solvent mixture is constituted by: propylene glycol monomethyl ether in an amount of about 50 to about 60 parts by weight, ethylene glycol mono-n-butyl ether in an amount of about 5 to about 6 parts by weight, ethanol in an amount of about 0.4 to about 0.5 parts by weight, isopropanol in an amount of about 0.4 to about 0.5 parts by weight, mineral spirits in an amount of about 12 to about 16 parts by weight, and water in an amount of about 2 to about 3 parts by weight.

* * * * *